United States Patent
Lee et al.

(10) Patent No.: US 11,723,033 B2
(45) Date of Patent: *Aug. 8, 2023

(54) METHOD FOR TRANSMITTING UPLINK SIGNAL IN WIRELESS COMMUNICATION SYSTEM AND APPARATUS THEREFOR

(71) Applicant: LG Electronics Inc., Seoul (KR)

(72) Inventors: Hyunho Lee, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,349

(22) Filed: Feb. 1, 2022

(65) Prior Publication Data

US 2022/0159648 A1    May 19, 2022

Related U.S. Application Data

(63) Continuation of application No. 16/612,227, filed as application No. PCT/KR2018/005347 on May 10, 2018, now Pat. No. 11,337,190.

(Continued)

(51) Int. Cl.
*H04W 72/04*    (2023.01)
*H04W 72/21*    (2023.01)
*H04L 5/00*     (2006.01)

(52) U.S. Cl.
CPC .......... *H04W 72/21* (2023.01); *H04L 5/0053* (2013.01)

(58) Field of Classification Search
CPC .......... H04W 72/1284; H04W 52/346; H04W 72/1278; H04W 28/0278; H04W 72/14;

(Continued)

(56) References Cited

U.S. PATENT DOCUMENTS

2014/0321389 A1   10/2014   Zhang et al.
2016/0249340 A1   8/2016    Cheng et al.
(Continued)

FOREIGN PATENT DOCUMENTS

KR    20140101830      8/2014
WO    WO2016108657    7/2016

OTHER PUBLICATIONS

Extended European Search Report in EP Appln. No. 18799022.1, dated Dec. 21, 2020, 6 pages.
Intel Corporation, "Segmentation in NR," R2-1703433, 3GPP TSG-RAN WG2 Meeting #97bis, Spokane, USA, dated Apr. 3-7, 2017, 3 pages.

(Continued)

*Primary Examiner* — Dady Chery
(74) *Attorney, Agent, or Firm* — Fish & Richardson P.C.

(57) ABSTRACT

A method for transmitting an uplink signal in multiple serving cells in a wireless communication system according to one embodiment of the present disclosure is performed by a terminal and may comprise the steps of: receiving a configuration of whether to activate an operation of repeating or segmenting a physical uplink control channel (PUCCH) in at least one secondary serving cell; and repeating or segmenting and transmitting a PUCCH in the at least one secondary serving cell according to the received configuration, wherein the configuration comprises information on the secondary serving cell and/or a bandwidth part (BWP) in which the repetition or segmentation operation is to be performed.

13 Claims, 11 Drawing Sheets

Related U.S. Application Data

(60) Provisional application No. 62/586,142, filed on Nov. 14, 2017, provisional application No. 62/541,105, filed on Aug. 4, 2017, provisional application No. 62/519,863, filed on Jun. 14, 2017, provisional application No. 62/518,511, filed on Jun. 12, 2017, provisional application No. 62/503,944, filed on May 10, 2017.

(58) Field of Classification Search
CPC ............ H04W 72/0413; H04L 1/1861; H04L 5/0042; H04L 1/1854; H04L 1/1893; H04L 1/0018; H04L 5/0053; H04L 5/0094; H04L 5/001
See application file for complete search history.

(56) References Cited

U.S. PATENT DOCUMENTS

2016/0277162 A1   9/2016  Dinan
2018/0077719 A1*  3/2018  Nory ................... H04L 5/0042

OTHER PUBLICATIONS

PCT International Search Report and Written Opinion in International Application No. PCT/KR2018/005347, dated Aug. 28, 2018, 21 pages (with English translation).
ZTE, ZTE Microelectronics, "Diversity based uplink transmission schemes," R1-1704394, 3GPP TSG RAN WG1 Meeting #88bis, Spokane, USA, dated Apr. 3-7, 2017, 3 pages.

* cited by examiner 2 symbol TTI DL structure 3 symbol TTI DL structure 4 symbol TTI DL structure 7 symbol TTI DL structure

METHOD FOR TRANSMITTING UPLINK SIGNAL IN WIRELESS COMMUNICATION SYSTEM AND APPARATUS THEREFOR

CROSS-REFERENCE TO RELATED APPLICATIONS

This application is a continuation of U.S. application Ser. No. 16/612,227, filed on Nov. 8, 2019, which is a National Stage application under 35 U.S.C. § 371 of International Application No. PCT/KR2018/005347, filed on May 10, 2018, which claims the benefit of U.S. Provisional Application No. 62/586,142, filed on Nov. 14, 2017, U.S. Provisional Application No. 62/541,105, filed on Aug. 4, 2017, U.S. Provisional Application No. 62/519,863, filed on Jun. 14, 2017, U.S. Provisional Application No. 62/518,511, filed on Jun. 12, 2017, and U.S. Provisional Application No. 62/503,944, filed on May 10, 2017. The disclosures of the prior applications are incorporated by reference in their entirety.

TECHNICAL FIELD

The present disclosure relates to a wireless communication system, and more particularly, to a method and apparatus for transmitting an uplink signal or receiving a downlink signal.

BACKGROUND

The next-generation system seeks to use a wide frequency band and support various services or requirements. For example, in regard to the $3^{rd}$ generation partnership project (3GPP) new radio access technology (NR) requirements, one of representative scenarios, ultra-reliable and low latency communications (URLLC) has the requirements of low latency and high reliability with a user-plane latency of 0.5 ms and transmission of X-byte data in 1 ms at or below an error rate of $10^{\wedge}-5$. While enhanced mobile broadband (eMBB) generally has a large traffic capacity, URLLC traffic ranges from tens of bytes to hundreds of bytes in file size and occurs sporadically. Accordingly, transmission that maximizes a transmission rate and minimizes the overhead of control information is required in eMBB, and a reliable transmission scheme with a short scheduling time unit is required in URLLC.

SUMMARY

An aspect of the present disclosure is to provide a user equipment (UE) operation for transmit diversity or a related base station (BS) or system operation.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, a method of transmitting an uplink signal in a plurality of serving cells, performed by a user equipment (UE), in a wireless communication system includes receiving a configuration indicating whether a repetition operation or a segmentation operation is enabled for a physical uplink control channel (PUCCH) in at least one secondary serving cell, and transmitting the PUCCH by repeating or segmenting the PUCCH in the at least one secondary serving cell according to the received configuration. The configuration includes information about a secondary serving cell and/or a bandwidth part (BWP) subjected to the repetition operation or the segmentation operation.

Additionally or alternatively, the method may further includes receiving a resource offset to determine a resource for use in transmitting the PUCCH in the secondary serving cell and/or the BWP, and determining the resource for use in transmitting the PUCCH based on the resource offset.

Additionally or alternatively, a resource offset may be configured for each secondary serving cell and/or each BWP, and a PUCCH resource in the secondary serving cell and/or the BWP may be determined to be a PUCCH resource spaced from a PUCCH resource indicated by the received configuration by the resource offset for the secondary serving cell and/or the BWP.

Additionally or alternatively, a physical uplink shared channel (PUSCH) scheduled in a part of the at least one secondary serving cell may be dropped.

Additionally or alternatively, when a simultaneous PUCCH and PUSCH transmission is configured for the UE, priority for transmission power allocation may be determined according to a channel type, a serving cell index, and whether uplink control information (UCI) is included.

Additionally or alternatively, the information about the secondary serving cell and/or the BWP subjected to the repetition operation or the segmentation operation may be changed by downlink control information (DCI) related to the PUCCH.

Additionally or alternatively, the PUCCH may be mapped to a different secondary serving cell and/or BWP in each symbol.

Additionally or alternatively, each state of a specific field in the DCI may be mapped to one of a plurality of secondary serving cells and/or BWPs, and upon receipt of the DCI, a repetition or segment of the PUCCH may be transmitted in at least one secondary serving cell and/or BWP selected from among the plurality of secondary serving cells and/or BWPs.

In another aspect of the present disclosure, a UE for transmitting an uplink signal in a plurality of serving cells in a wireless communication system includes a receiver and a transmitter, and a processor configured to control the receiver and the transmitter. The processor is configured to receive a configuration indicating whether a repetition operation or a segmentation operation is enabled for a physical uplink control channel (PUCCH) in at least one secondary serving cell, and transmit the PUCCH by repeating or segmenting the PUCCH in the at least one secondary serving cell according to the received configuration. The configuration includes information about a secondary serving cell and/or a BWP subjected to the repetition operation or the segmentation operation.

Additionally or alternatively, the processor may be configured to receive a resource offset to determine a resource for use in transmitting the PUCCH in the secondary serving cell and/or the BWP, and determine the resource for use in transmitting the PUCCH based on the resource offset.

Additionally or alternatively, a resource offset may be configured for each secondary serving cell and/or each BWP, and a PUCCH resource in the secondary serving cell and/or the BWP may be determined to be a PUCCH resource spaced from a PUCCH resource indicated by the received configuration by the resource offset for the secondary serving cell and/or the BWP.

Additionally or alternatively, a PUSCH scheduled in a part of the at least one secondary serving cell may be dropped.

Additionally or alternatively, when a simultaneous PUCCH and PUSCH transmission is configured for the UE, priority for transmission power allocation may be determined according to a channel type, a serving cell index, and whether UCI is included.

Additionally or alternatively, the information about the secondary serving cell and/or the BWP subjected to the repetition operation or the segmentation operation may be changed by DCI related to the PUCCH.

Additionally or alternatively, the PUCCH may be mapped to a different secondary serving cell and/or BWP in each symbol.

Additionally or alternatively, each state of a specific field in the DCI may correspond to one of a plurality of secondary serving cells and/or BWPs, and upon receipt of the DCI, a repetition or segment of the PUCCH may be transmitted in at least one secondary serving cell and/or BWP selected from among the plurality of secondary serving cells and/or BWPs.

Additionally or alternatively, the UE is a part of an autonomous driving device that communicates with at least one of a network or another autonomous driving vehicle.

The above-described aspects of the present disclosure are merely parts of the embodiments of the present disclosure. It will be understood by those skilled in the art that various embodiments are derived from the following detailed description of the present disclosure without departing from the technical features of the disclosure.

According to the embodiments of the present disclosure, an uplink transmission may be efficiently performed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1A:
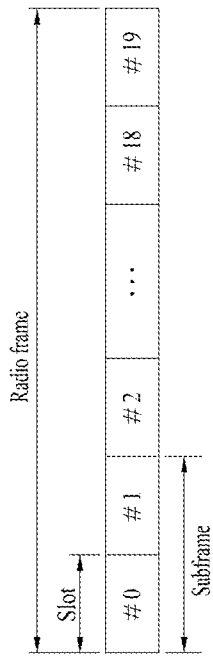
FIGS. 1A and 1B are diagrams for an example of a radio frame structure used in wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'mobile station (MS)', 'mobile terminal (MT)', 'user terminal (UT)', 'subscriber station (SS)', 'wireless device', 'personal digital assistant (PDA)', 'wireless modem', 'handheld device', etc. A BS is typically a fixed station that communicates with a UE and/or another BS. The BS exchanges data and control information with a UE and another BS. The term 'BS' may be replaced with 'advanced base station (ABS)', 'Node B', 'evolved-Node B (eNB)', 'base transceiver system (BTS)', 'access point (AP)', 'processing server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink (DL) signal is discriminated from a node transmitting an uplink (UL) signal is called multi-eNB multiple input multiple output (MIMO) or coordinated multi-point Tx/Rx (CoMP). Coordinated transmission schemes from among CoMP communication schemes can be categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A DL/UL signal of a specific cell refers to a DL/UL signal from/to an eNB or a node providing communication services to the specific cell. A cell providing UL/DL communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure DL channel state from a specific node using one or more channel state information reference signals (CSI-RSs) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, physical DL control channel (PDCCH)/physical control format indicator channel (PCFICH)/physical hybrid automatic repeat request indicator channel (PHICH)/physical DL shared channel (PDSCH) refer to a set of time-frequency resources or resource elements respectively carrying DL control information (DCI)/control format indicator (CFI)/DL acknowledgement (ACK)/negative ACK (NACK)/DL data. In addition, physical UL control channel (PUCCH)/physical UL shared channel (PUSCH)/physical random access channel (PRACH) refer to sets of time-frequency resources or resource elements respectively carrying UL control information (UCI)/UL data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of UL control information/UL data/random access signal through or on PUCCH/PUSCH/PRACH. Furthermore, transmission of PDCCH/PCFICH/PHICH/PDSCH by an eNB is equivalent to transmission of DL data/control information through or on PDCCH/PCFICH/PHICH/PDSCH.

Figure 1B:
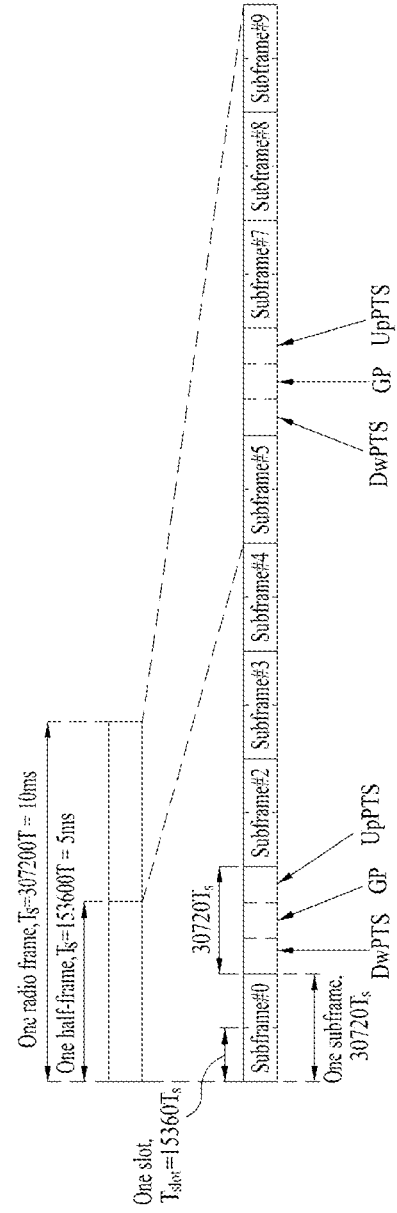

FIGS. 1A and 1B illustrate an exemplary radio frame structure used in a wireless communication system. FIG. 1A illustrates a frame structure for frequency division duplex (FDD) used in 3GPP LTE/LTE-A and FIG. 1B illustrates a frame structure for time division duplex (TDD) used in 3GPP LTE/LTE-A.

Referring to FIGS. 1A and 1B, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from UL transmission by frequency in FDD mode, and thus the radio frame includes only one of a DL subframe and an UL subframe in a specific frequency band. In TDD mode, DL transmission is discriminated from UL transmission by time, and thus the radio frame includes both a DL subframe and an UL subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes an UL subframe and S denotes a special subframe. The special subframe includes three fields of DwPTS (Downlink Pilot Time Slot), GP (Guard Period), and UpPTS (Uplink Pilot Time Slot). DwPTS is a period reserved for DL transmission and UpPTS is a period reserved for UL transmission. Table 2 shows special subframe configuration.

symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a DL slot and $N_{RB}^{UL}$ denotes the number of RBs in an UL slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the DL slot and $N_{symb}^{UL}$ denotes the number of OFDM symbols in the UL slot. In addition, $N_{sc}^{RB}$ denotes the number of subcarriers constructing one RB.

Figure 2:
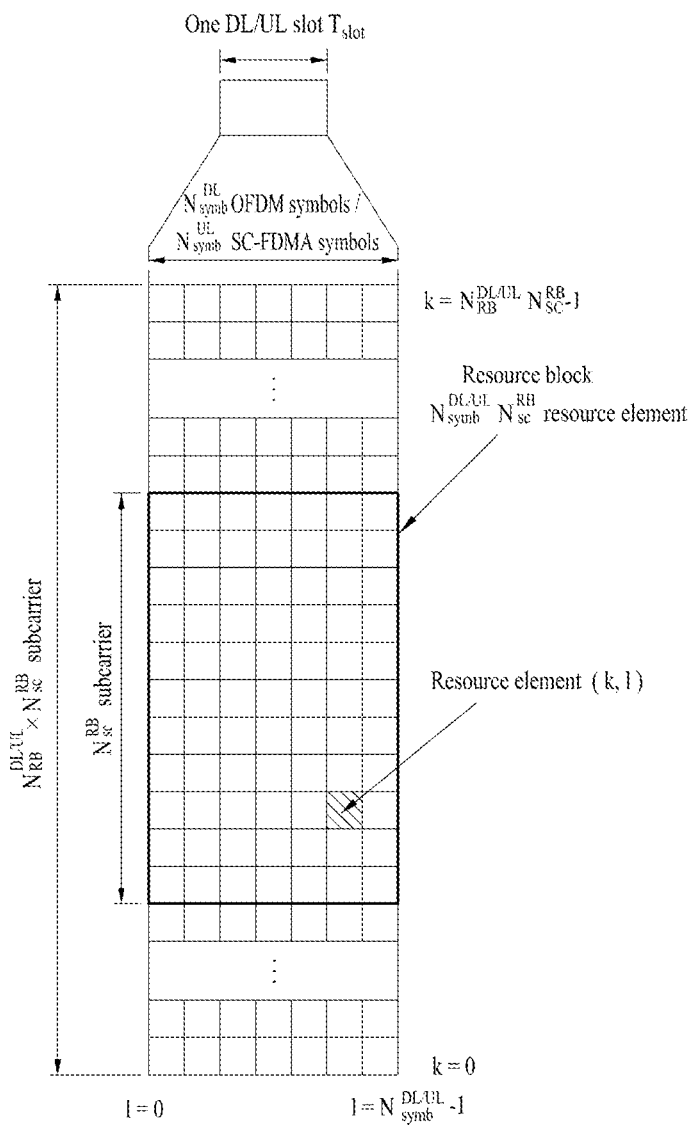
FIG. 2 is a diagram for an example of a downlink (DL)/uplink (UL) slot structure in a wireless communication system.

An OFDM symbol may be called a single carrier frequency division multiplexing (SC-FDM) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The

TABLE 2

| | Normal cyclic prefix in DL | | | Extended cyclic prefix in DL | | |
|---|---|---|---|---|---|---|
| | | UpPTS | | | UpPTS | |
| Special subframe configuration | DwPTS | Normal cyclic prefix in UL | Extended cyclic prefix in UL | DwPTS | Normal cyclic prefix in UL | Extended cyclic prefix in UL |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

FIG. 2 illustrates an exemplary DL/UL slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
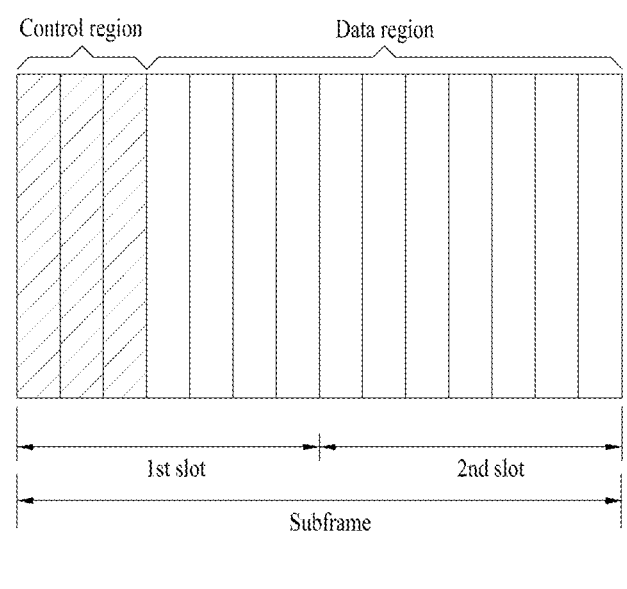
FIG. 3 is a diagram for an example of a DL subframe structure used in a $3^{rd}$ generation partnership project (3GPP) long term evolution (LTE)/long term evolution-advanced (LTE-A) system.

FIG. 3 illustrates a DL subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical DL shared chancel (PDSCH) is allocated. A resource region available for PDSCH transmission in the DL subframe is referred to as a PDSCH region hereinafter. Examples of DL control channels used in 3GPP LTE include a PCFICH, a PDCCH, a PHICH, etc. The PCFICH is transmitted at a first OFDM symbol of a subframe and carries information regarding the number of OFDM symbols used for transmission of control channels within the subframe. The PHICH is a response of UL transmission and carries an HARQ ACK/NACK signal.

Control information carried on the PDCCH is called DCI. The DCI contains resource allocation information and control information for a UE or a UE group. For example, the DCI includes a transport format and resource allocation information of a DL shared channel (DL-SCH), a transport format and resource allocation information of an UL shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), DL assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for UL and formats 1, 1A, 1B, 1C, 1D, 2, 2A, 2B, 2C, 3 and 3A for DL, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate in a search space, and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a PDSCH may be allocated to the data region. A PCH and a DL-SCH are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is cyclic redundancy check (CRC)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a demodulation RS (DM RS) dedicated for a specific UE. A DM RS transmitted by the eNB for demodulation of DL data for a specific UE is called a UE-specific RS. Both or one of DM RS and CRS may be transmitted on DL. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
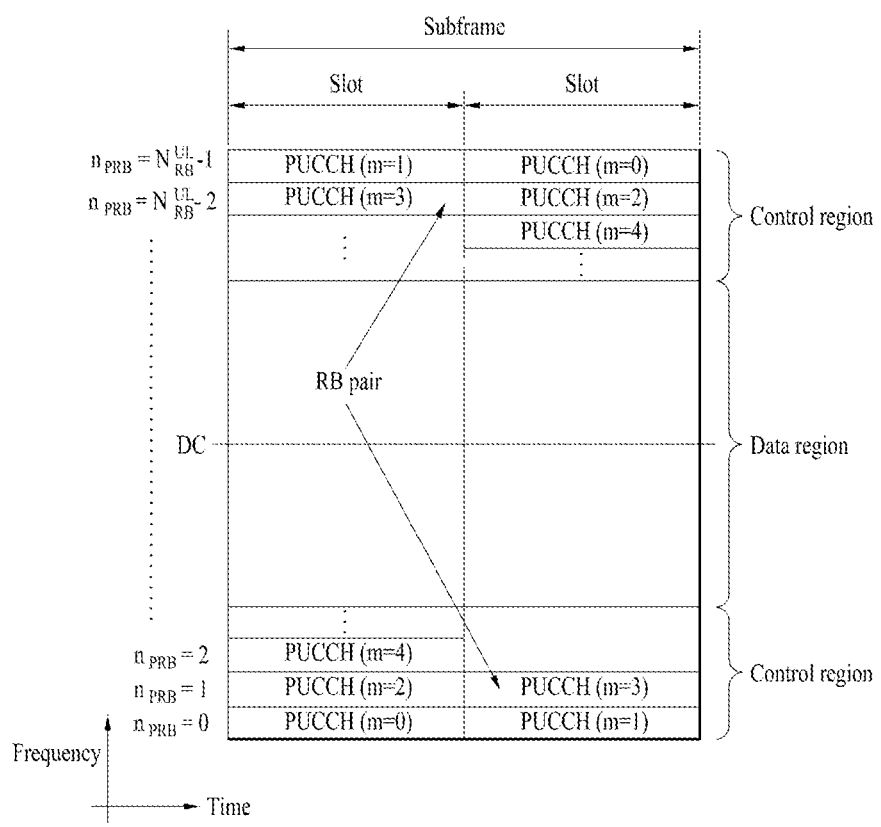
FIG. 4 is a diagram for an example of a UL subframe structure used in the 3GPP LTE/LTE-A system.

FIG. 4 illustrates an exemplary UL subframe structure used in 3GPP LTE/LTE-A.

Referring to FIG. 4, a UL subframe can be divided into a control region and a data region in the frequency domain. One or more PUCCHs can be allocated to the control region to carry UCI. One or more PUSCHs may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme HARQ ACK/NACK: This is a response signal to a DL data packet on a PDSCH and indicates whether the DL data packet has been successfully received. A 1-bit ACK/NACK signal is transmitted as a response to a single DL codeword and a 2-bit ACK/NACK signal is transmitted as a response to two DL codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK Channel State Information (CSI): This is feedback information about a DL channel. Feedback information regarding MIMO includes a rank indicator (RI) and a PMI.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an UL reference signal and a DL reference signal. In LTE, the UL reference signal includes:

i) a DMRS for channel estimation for coherent demodulation of information transmitted through a PUSCH and a PUCCH; and ii) an SRS used for an eNB to measure UL channel quality at a frequency of a different network.

The DL reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a CSI-RS for delivering CSI when a DL DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

RSs can be classified into an RS for channel information acquisition and an RS for data demodulation. The former needs to be transmitted in a wide band as it is used for a UE to acquire channel information on DL transmission and received by a UE even if the UE does not receive DL data in a specific subframe. This RS is used even in a handover situation. The latter is transmitted along with a corresponding resource by an eNB when the eNB transmits a DL signal and is used for a UE to demodulate data through channel measurement. This RS needs to be transmitted in a region in which data is transmitted.

Figure 5:
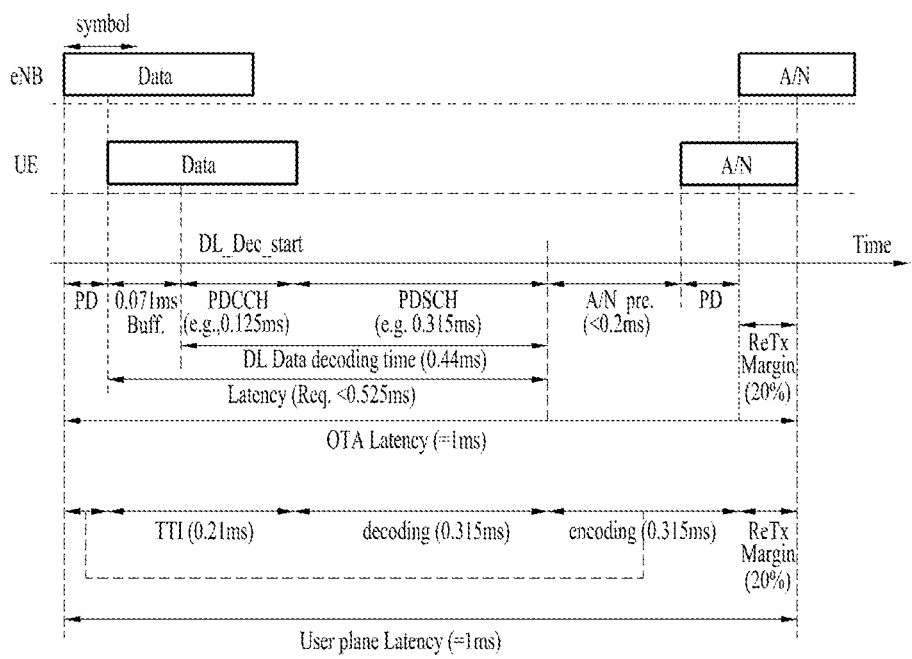
FIG. 5 illustrates a decrease in the length of a transmission time interval (TTI) according to reduction in user-plane latency.

To satisfy a reduction in the above-described latency, i.e., low latency, a TTI, which is a minimum unit for data transmission, needs to be newly designed to be reduced to a shortened TTI (sTTI) which is equal to or less than 0.5 msec (ms). For example, as illustrated in FIG. 5, in order to reduce user-plane (U-plane) latency to 1 ms until the UE completes transmission of ACK/NACK (A/N) since the eNB has started transmission of data (a PDCCH and a PDSCH), the sTTI may be configured in units of about 3 OFDM symbols.

Figure 6:
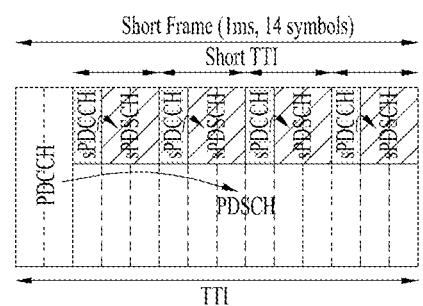
FIG. 6 illustrates an example of configuring a plurality of short TTIs in one subframe.

In a DL environment, a PDCCH for data transmission/scheduling within the sTTI (i.e., a sPDCCH) and a PDSCH for transmitting data within the sTTI (i.e., a sPDSCH) may be transmitted. For example, as illustrated in FIG. 6, a plurality of sTTIs may be configured using different OFDM symbols in one subframe. Characteristically, OFDM symbols in which legacy channels are transmitted may be excluded from OFDM symbols constituting an sTTI. The sPDCCH and the sPDSCH within the sTTI may be transmitted in different OFDM symbol regions by being time-division-multiplexed (TDMed) or may be transmitted in different PRBs or on different frequency resources by being frequency-division-multiplexed (FDMed).

As in the above-described DL environment, data may be transmitted/scheduled within an sTTI in a UL environment, and the counterparts of the TTI-based legacy PUCCH and PUSCH are referred to as sPUCCH and sPUSCH, respectively.

Figure 7A:
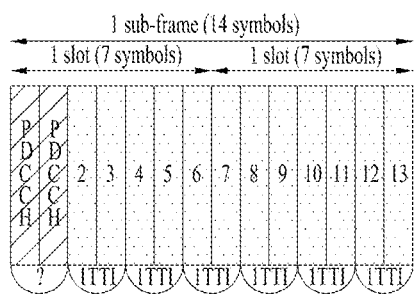
FIGS. 7A to 7D illustrate the structures of DL subframes including short TTIs of multiple lengths (various numbers of symbols)
Figure 7B:
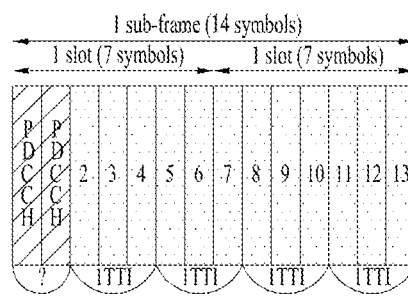
Figure 7C:
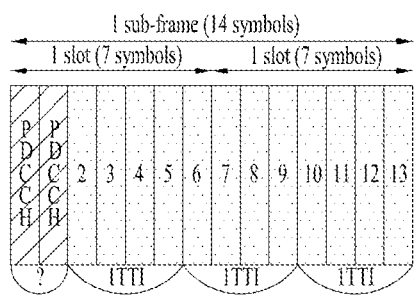

In the present disclosure, a description is given based on an LTE/LTE-A system. In a legacy LTE/LTE-A system, a 1-ms subframe may include 14 OFDM symbols in the case of a normal CP. If the 1-ms subframe is configured by TTIs shorter than 1 ms, one subframe may include a plurality of TTIs. As in examples illustrated in FIGS. 7A to 7D, 2 symbols, 3 symbols, 4 symbols, or 7 symbols may constitute one TTI. Although not illustrated, the case in which one symbol constitutes one TTI may be considered. If one symbol constitutes one TTI unit, 12 TTIs are generated under the assumption that legacy PDCCHs are transmitted in two OFDM symbols. Similarly, as illustrated in FIG. 7A, if two symbols constitute one TTI unit, 6 TTIs may be generated. As illustrated in FIG. 7B, if 3 symbols constitute one TTI unit, 4 TTIs may be generated. As illustrated in FIG. 7C, if 4 symbols constitute one TTI unit, 3 TTIs may be generated. In this case, it is assumed that legacy PDCCHs are transmitted in the first starting two OFDM symbols.

Figure 7D:
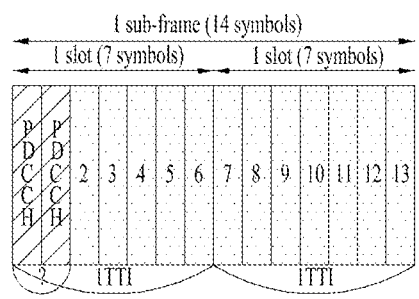

As illustrated in FIG. 7D, in the case in which 7 symbols constitute one TTI, 7 symbols including legacy PDCCHs may constitute one TTI and 7 subsequent symbols may constitute one TTI. If one TTI includes 7 symbols, a UE supporting an sTTI assumes that, in a TTI located at a front part of one subframe (i.e., the first slot), front two OFDM symbols in which legacy PDCCHs are transmitted are punctured or rate-matched and that data of the UE and/or control information is transmitted in 5 symbols subsequent to the front two symbols. In contrast, the UE assumes that, in a TTI located at a rear part of one subframe (i.e., the second slot), data and/or control information may be transmitted in all of 7 symbols without a punctured or rate-matched resource region.

Figures 8A, 8B:
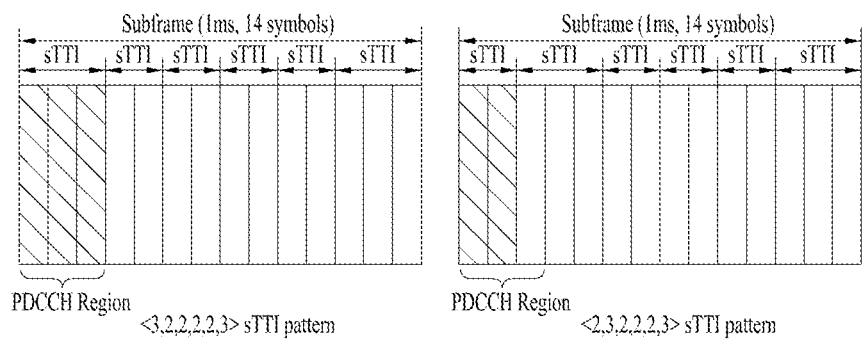
FIGS. 8A and 8B illustrate the structures of DL subframes including short TTIs of 2 and 3 symbols.

The present disclosure considers an sTTI structure in which an sTTI including 2 OFDM symbols (hereinafter, OFDM symbols are referred to as "OSs") and an sTTI including 3 OSs are mixed in one subframe as illustrated in FIGS. 8A and 8B. In this way, an sTTI including 2 OSs or 3 OSs may be simply defined as 2-symbol sTTI (i.e., a 2-OS sTTI). Further, a 2-symbol sTTI or a 3-symbol sTTI may be referred to simply as a 2-symbol TTI or a 3-symbol TTI, all of which are apparently TTIs shorter than the legacy 1-ms TTI based on which the present disclosure is. That is, when "TTI" is mentioned herein, this also covers an sTTI, and the present disclosure relates to a communication scheme in a system configured with a shorter TTI than the legacy TTI, regardless of the appellation.

In the present disclosure, a numerology refers to determining a TTI length or subcarrier spacing to be applied to a wireless communication system, a parameter such as a predetermined TTI length or subcarrier spacing, or a communication structure or system based on the parameter.

In a <3,2,2,2,2,3> sTTI pattern illustrated in FIG. 8A, an sPDCCH may be transmitted according to the number of symbols of a PDCCH. In a <2,3,2,2,2,3> sTTI pattern illustrated in FIG. 8B, it may be difficult to transmit the sPDCCH due to a legacy PDCCH region.

New Radio Technology (NR)

While the structure, operation, or function of the 3GPP LTE(-A) system has been described above, the structure, operation, or function of the 3GPP LTE(-A) system may be slightly modified or implemented in other ways in NR. Some of the modifications and implementations will be briefly described.

NR supports various numerologies. For example, a subcarrier spacing of up to a $2^n$ multiple of 15 KHz (n=1, 2, 3, 4) as well as a subcarrier spacing of 15 KHz is supported.

Further, in the case of a normal CP, although the number of OFDM symbols (hereinafter, simply referred to as "symbols") per slot is fixed to 14, the supported number of slots in one subframe is up to $2^k$ (k=0, 1, 2, 3, 4, and 5) and a radio frame includes 10 subframes as in the legacy LTE system. In the case of an extended CP, the number of symbols per slot is fixed to 12, and one subframe includes 4 slots. Further, one RB is defined by 12 consecutive subcarriers in the frequency domain, as in the legacy LTE system.

Further, the use (e.g., DL, UL, or flexible) of each symbol in one slot may be defined according to a slot format, and both a DL symbol and a UL symbol may be configured in one slot. This case is referred to as a self-contained subframe (or slot) structure.

The next-generation system seeks to use a wide frequency band and support various services or requirements. For example, in regard to the 3GPP NR requirements, one of representative scenarios, ultra-reliable and low latency communications (URLLC) has the requirements of low latency and high reliability with a user-plane latency of 0.5 ms and transmission of X-byte data in 1 ms at or below an error rate of 10^-5. While enhanced mobile broadband (eMBB) generally has a large traffic capacity, URLLC traffic ranges from tens of bytes to hundreds of bytes in file size and occurs sporadically. Accordingly, transmission that maximizes a transmission rate and minimizes the overhead of control information is required in eMBB, and a reliable transmission scheme with a short scheduling time unit is required in URLLC.

Different reference time units may be assumed/used in transmitting and receiving a physical channel depending on applications or traffic types. A reference time unit may refer to a basic unit of scheduling a specific physical channel, and a different reference time unit may be configured according to the number of symbols and/or a subcarrier spacing in the scheduling unit. For the convenience of description, embodiments of the present disclosure will be described in the context of a slot and a mini-slot as reference time units. A slot may be a basic scheduling unit used, for example, for general data traffic (e.g., eMBB). A mini-slot, which lasts less than a slot in the time domain, may be a basic scheduling unit used for more special-purpose traffic or communication scheme (e.g., URLLC, an unlicensed band, or millimeter wave). However, this is a mere embodiment, and obviously, the present disclosure may be extended to the case in which a physical channel is transmitted and received at a mini-slot level in eMBB or at a slot level in URLLC or another communication scheme.

A component carrier (CC) proposed in the present disclosure may be replaced with a bandwidth part (BWP) configured for a UE. A similar method may be applied, when multiple BWPs within one wideband carrier are configured for a UE. That is, the terms CC and BWP are interchangeably used in the disclosure. This implies that a CC may be replaced with a carrier from the perspective of a UE, not from the perspective of a network. Accordingly, the present disclosure is also applicable, when a UE is configured with multiple active BWPs within one network carrier in view of different numerologies.

Ultra-Reliable Transmission Using Diversity Schemes
Segmentation or Segmented Transmissions In order to satisfy the requirements of low latency and high reliability for URLLC traffic, it may be regulated that a specific transport block (TB)/code block (CB)/CB group (CBG) is transmitted across a plurality of component carriers (CCs)/transmission and reception points (TRP). Specifically, after the TB/CBG/CB is divided into several segments, the segments may be distributed and transmitted in the plurality of CCs/TRPs, respectively, or the TB/CBG/CB may be repeatedly mapped to and transmitted in the plurality of CCs/TRPs.

Specifically, the TB/CBG/CB is mapped to the plurality of CCs/TRPs in the following methods.

Alt 1: One TB is repeated/copied and mapped to the plurality of CCs/TRPs.

Alt 2: One TB is mapped to the plurality of CCs/TRPs, with a plurality of respective CBGs in the TB distributed and mapped to the CCs/TRPs.

Alt 3: One CBG is repeated/copied and mapped to the plurality of CCs/TRPs.

Alt 4: One CBG is mapped to the plurality of CCs/TRPs, with a plurality of respective CBs in the CBG distributed and mapped to the CCs/TRPs.

Alt 5: One CB is repeated/copied and mapped to the plurality of CCs/TRPs.

Alt 6: One or more codewords may be transmitted, with each of the codewords mapped to one CC/TRP. Multiple codewords may be scheduled by one DCI. When this method is used, one codeword may be mapped to one or more CCs/TRPs in consideration of the presence of more carriers or TRPs than the codewords. Further, one or two codewords may be mapped to the entire CCs/TRPs. In this case, it is assumed that information scheduling the corresponding codeword is carried in one DCI. Alternatively, although separate DCI is possible, a relationship between codewords may be previously specified.

Alt 7: One TB is mapped to the plurality of CCs/TRPs. In this case, an RB set accessible for resource allocation may be scheduled by logically concatenating resources of the CCs/TRPs. For example, when two carriers are 100 RBs and 50 RBs, respectively, the entire resource allocation may be performed for 150 RBs. An RBG size per carrier/TRP may be set differently. Assume that the corresponding TB is scheduled by one DCI.

Information about the CCs/TRPs to which the TB/CBG/CB is mapped may be indicated by a physical-layer signal (e.g., DCI) that schedules the TB/CBG/CB. When the TB/CBG/CB is scheduled by DCI, the index of a transmission CC/TRP may be set separately for each TB, CBG, or CB, the number of CCs/TRPs may be configured and the CCs/TRPs may be distributed according to a specific rule, or when a specific field is configured, the CCs/TRPs may be distributed across all active carriers. Characteristically, the information about the CCs/TRPs to which the TB/CBG/CB is mapped may be indicated by a group-common PDCCH or an individual DCI (DCI including a resource assignment for each TB/CBG/CB). Alternatively, the information about the CCs/TRPs to which the TB/CBG/CB is mapped may be configured by a higher-layer signal or pre-agreed. For example, the information about the CCs/TRPs to which the TB/CBG/CB is mapped may be determined by a function of the index of a scheduling cell and/or the index of a scheduled cell. More specifically, CCs to which a specific TB/CBG/CB is to be mapped may be pre-agreed to be X cells including a scheduled cell in an ascending order of cell indexes.

The information about the CCs to which the TB/CBG/CB is to be mapped includes cell indexes (or a combination index indicating cell information for a plurality of cells) and/or the number of cells to which the CB/CBG is to be mapped and/or information about a part of the cells to which the CB/CBG is to be mapped (e.g., the lowest/highest cell index).

Whether the operation of transmitting a TB/CBG/CB over a plurality of CCs/TRPs is enabled or not may be configured for the UE by a higher-layer signal or may be indicated by a physical-layer signal. Characteristically, a specific field of DCI may indicate whether the operation of transmitting a TB/CBG/CB in a plurality of CCs/TRPs is enabled or not, or the UE may assume the difference by distinguishing between search spaces, between scramblings, between RNTIs, or between a grant received before A/N transmission and a grant which is not received before the A/N transmission. Alternatively, the operation may be indicated by a group-common PDCCH. Alternatively, the operation is automatically enabled for a channel scheduled in a specific scheduling unit. For example, it may be regulated that the operation of transmitting a TB/CBG/CB over a plurality of CCs/TRPs is performed for a channel scheduled in a mini-slot. In the case where the operation is triggered, when information about CCs/TRPs is received in DCI, the size of the DCI may be different, compared to transmission in a single carrier/TRP, thereby increasing the number of blind decodings of the UE. Thus, for example, when a CBG is transmitted over multiple CCs/TRPs, the following scheme may be considered.

The UE is configured to initially transmit and/or retransmit a CBG in each CC/TRP.

DCI is transmitted separately for each CC/TRP (cross-carrier scheduling may be performed by the DCI), and thus only a scheduled CBG is transmitted in each carrier. For example, when even-numbered/odd-numbered CBGs are transmitted over 2 CCs, DCI1 that schedules an even-numbered CBG is transmitted in CC1 and DCI2 that schedules an odd-numbered CBG is transmitted in CC2.

In the case of an initial transmission, when each CBG is partially transmitted, an indication of a total transport block size (TBS) may be required. This information may be transmitted in a CC/TRP corresponding to the lowest cell index among the transmitted CCs/TRPs. Alternatively, RA- or TBS-related information (e.g., the number of RBs+a scaling factor) may be additionally transmitted to infer the TBS.

Retransmission Scheme when Segmentation or Repeated Transmission is Supported

Retransmission operations are proposed for the case where the specific TB/CBG/CB is transmitted across a plurality of CCs/TRPs.

Alt 1: A retransmission is performed by applying the same TB/CBG/CB mapping as that used in a previous transmission. That is, the CCs/TRPs in which the retransmission is performed may not be changed.

Alt 2: It may be regulated that in a retransmission, the TB/CBG/CB may be mapped to different CCs/TRPs from those in a previous transmission. Characteristically, in the retransmission, the TB/CBG/CB may be mapped to the same number of different CCs/TRPs as the CCs/TRPs used in the previous transmission, or the CCs/TRPs in the retransmission may be a subset of the CCs/TRPs used in the previous transmission. This may be intended to ensure reliability by causing the TB/CBG/CB to experience different channels if decoding of the previous transmission fails. Specifically, it may be regulated that information on the CCs/TRPs to which the TB/CBG/CB is mapped in the retransmission is indicated by retransmission scheduling DCI. Alternatively, the information may be configured UE-specifically by a higher-layer signal. For example, a relationship (e.g., an offset) between the CCs/TRPs to which the TB/CBG/CB is to be mapped in the retransmission and the CCs/TRPs to which the TB/CBG/CB was mapped in the initial transmission may be configured for the UE by a higher-layer signal.

Alt 3: It may be regulated that a retransmission is performed based on a CC/TRP in which an HARQ-ACK for the TB/CBG/CB is ACK. For example, when CBGs 1, 2, and 3 are mapped to and transmitted in CCs 1, 2, and 3, respectively, and HARQ-ACKs for the CBGs are (A, N, A), a retransmission for CBG 2 is repeated/copied over CCs 1 and 3, or CBG2 is split into two segments and transmitted in CCs 1 and 3.

Alt 4: A transmission operation needs to be defined for the case where another channel is transmitted or scheduled in a CC/TRP to which a TB/CBG/CB is to be mapped at a retransmission. In this case, it may be regulated that the TB/CBG/CB corresponding to the retransmission is mapped to only the remaining CC/TRPs except the CC/TRP. Characteristically, this may be applied when a TB/CBG/CB is repeated/copied and mapped to a plurality of CCs/TRPs. Alternatively, whether or not the CC/TRP is mapped may be determined according to priority with other channels. For example, in the case of collision with an initial transmission channel, it may be regulated that the initial transmission channel is dropped and the retransmission TB/CBG/CB is mapped to the CC/TRP with priority. In another example, the priorities of scheduling units may be considered. In the case of collision with a mini-slot-based initial transmission channel, the retransmission TB/CBG/CB is not mapped to the corresponding CC/TRP, and the initial transmission channel is transmitted with priority.

CRC Configuration

When the specific TB/CBG/CB is transmitted across a plurality of CCs/TRPs, a CRC may be included on a CC/TRP basis. Specifically, a CRC may be included on a CC/TRP basis in the specific TB/CBG/CB repeated/copied and mapped to the plurality of CCs/TRPs.

Maximum TBS Determination Method

When the above-described method is used, a maximum TBS may be determined in the following methods.

Alt 1: A maximum schedulable TBS may be set to the minimum or maximum of TBSs that each CC/TRP may handle.

Alt 2: A maximum schedulable TBS may be set to the sum of TBSs that each CC/TRP may handle, and characteristically, the sum of the CCs/TRPs to which data is mapped.

HARQ Process Determination Method

When the above-described method is used, an HARQ process may be determined in the following methods.

Alt 1: An HARQ process used for the method is separately configured. The HARQ process is not available in every CC/TRP and is reserved for the operation.

Alt 2: A main CC/TRP is determined from among multiple CCs, and transmission is assumed to be in an HARQ process of the CC/TRP. When this method is used, HARQ-ACK transmission and retransmission may also be performed in the main CC/TRP.

Alt 3: It is assumed that a specified HARQ process is used for each CC/TRP.

Alt 4: When multiple codewords or TBs are mapped to each CC/TRP, it may be assumed that the HARQ process ID is sequentially increased according to the cell ID index. This means that a scheme in which a CC is assumed to be transmitted through mapping similar to that in a method of transmitting a CC in a plurality of subframes/slots in the time domain may be applied.

Method Using Soft Buffer

Alt 1: A soft buffer may be allocated separately from a soft buffer allocated to a CC/TRP.

Alt 2: A main CC/TRP may be determined from among multiple CCs/TRPs, and a soft buffer of the CC/TRP may be used.

Alt 3: A different soft buffer configuration is applied according to a TB mapping method. For example, when a TB is mapped to multiple CCs/TRPs, the soft buffer may be divided into soft buffers of the respective CCs.

Overall Behavior on UL Repetition

For the convenience of description, a method of repeatedly transmitting the same information/channel in a plurality of CCs and/or BWPs is referred to as frequency-domain repetition, a method of repeatedly transmitting the same information/channel in a plurality of TTIs is referred to as time-domain repetition, and a method of repeatedly transmitting the same information/channel in a plurality of layers is referred to as space-domain repetition. Similarly, a method of segmenting and transmitting the same information/channel in a plurality of CCs and/or BWPs is referred to as frequency-domain segmentation, a method of segmenting and transmitting the same information/channel in a plurality of TTIs is referred to as time-domain segmentation, and a method of segmenting and transmitting the same information/channel in a plurality of layers is referred to as space-domain segmentation.

Depending on the power allocation state of the UE, the repetition/segmentation behavior may be determined differently. Characteristically, for a UE placed in a non-power-limited situation, frequency-domain repetition/segmentation and/or space-domain repetition/segmentation is configured, whereas for a UE placed in a power-limited situation, time-domain repetition/segmentation and/or no repetition/segmentation is configured. The power-limited situation means that the total transmission power of the UE exceeds a maximum transmission power of the UE, and otherwise, the situation is a non-power-limited situation.

This is because in the power-limited situation, even though information is repeatedly loaded in CCs or in the space domain, power needs to be divided and thus the improvement of transmission performance may be negligibly slight. It may be regulated that for a UE in a non-power-limited situation, a repetition/segmentation operation in a specific domain is enabled, while for a UE in a power-limited situation, the repetition/segmentation operation is disabled.

Alternatively, the UE may adjust the degree of repetition/segmentation so as not to be placed in a power-limited situation. Characteristically, it may be regulated that the UE determines the number of CCs and/or BWPs and/or layers and/or TTIs, for repetition/segmentation, in order not to be placed in a power-limited situation. This overrides a number previously configured (by a higher-layer signal or DCI), and the UE performs repetition/segmentation only by the number of CCs and/or BWPs and/or layers and/or TTIs determined in the rule. More characteristically, (a set of) candidate numbers of CCs and/or BWPs and/or layers and/or TTIs, for repetition/segmentation are predefined or signaled, among which a maximum number of CCs and/or BWPs and/or layers and/or TTIs, which prevents the UE from being placed in a power-limited situation, may be selected as one of the candidates (in the set).

Alternatively, a different repetition/segmentation operation may be configured according to a waveform used for the UL of the UE. For example, when OFDM is used for the UL, transmission may be performed in non-contiguous frequencies, and thus frequency diversity is sought in one CC. However, when SC-OFDM is used for the UE, transmission may be performed across two CCs by using different RFs.

Alternatively, a different repetition/segmentation operation may be configured according to a target service and/or a quality of service (QoS) and/or a block error rate (BLER) requirement. For example, time-domain repetition/segmentation may be configured for a transmission/channel requiring high reliability, whereas frequency-domain repetition/segmentation and/or space-domain repetition/segmentation may be configured for a transmissions/channel requiring low latency.

For example, it may be regulated that repetition/segmentation is not applied to an HARQ-ACK for a PDSCH corresponding to eMBB, and repetition/segmentation is applied to an HARQ-ACK for a PDSCH corresponding to URLLC. Alternatively, for the case of receiving slot or multi-slot scheduling and the case of mini-slot or multi-mini-slot scheduling, repetition numbers, whether repetition/segmentation is to be applied, or BLER targets of HARQ-ACK transmission may be configured to be different. If HARQ-ACKs for two schedulings or different QoS data are bundled/multiplexed, the BLER target may follow the highest one, may follow the attributes of a first PDSCH, or may not allow bundling/multiplexing between different HARQ-ACKs.

Alternatively, which repetition/segmentation operation among the above repetition/segmentation operations (which may include a repetition number) (characteristically, applied for a specific channel) is enabled may be configured for to the UE by a higher-layer signal, or indicated to the UE by DCI. In a characteristic example, which one of the above repeat/segmentation operations is enabled may be indicated by group-common DCI or first-DCI of two-level DCI. More particularly, the repetition/segmentation operation (e.g., time-domain repetition/segmentation, frequency-domain repetition/segmentation, space-domain repetition/segmentation) may be indicated to the UE by the eNB (by higher-layer signaling and/or group-common DCI and/or third DCI). And/or the repetition/segmentation operation may be determined based on a specific power level or range (as indicated by the eNB).

More specifically, in the case of a PUSCH transmission, a different MCS/repetition number is configured for each bearer. Therefore, the PUSCH transmission is based on a higher-layer configuration or information configured in a UL grant. When a transmission is performed without a UL grant, like a grant-free transmission, it may be assumed that particularly a higher-layer configuration is followed. In addition, for a CSI transmission, it may be assumed that corresponding information is transmitted together in the configuration in the case of periodic CSI. When aperiodic CSI is triggered by DCI, information about a repetition/segmentation operation (e.g., a repetition/segmentation method and a repetition number) or a BLER target or transport channel (when it is assumed that the target BLER is different for each transport channel) may be indicated. In addition, in the case of HARQ-ACK, it may also be assumed that corresponding information is transmitted together in the configuration. When aperiodic CSI is triggered by DL scheduling DCI, information about a repetition/segmentation operation (e.g., a repetition/segmentation method and a repetition number) or a BLER target or transport channel (when it is assumed that the target BLER, AN error, and NA error are different for each transport channel) may be indicated.

Alternatively, whether repetition/segmentation for a specific channel is enabled may be configured for the UE by a higher-layer signal or indicated to the UE by DCI. In a characteristic example, whether repetition/segmentation for the particular channel is enabled may be indicated to the UE by group-common DCI or the first-DCI of two-level DCI.

It may be regulated that a UE capability is reported in relation to the repetition/segmentation operation. Characteristically, among time-domain repetition/segmentation, frequency-domain repetition/segmentation, space-domain repetition/segmentation, or a combination of all/some of them one or more repetition/segmentation operations supported by the UE may be reported to the network. Such a capability may vary depending on a scheduling unit supported by the UE, or may vary according to a frequency band, a frequency band combination, or a frequency range.

Reliable UCI Transmission

A CC and/or a BWP to which UCI is piggybacked may be determined according to a target service and/or a QoS and/or a BLER requirement/target BLER of the UCI. Specifically, when the UCI is an HARQ-ACK, a target service and/or a QoS and/or a BLER requirement of a PDSCH corresponding to the HARQ-ACK may be included (this is assumed to be determined in the manner described in the foregoing section "Overall Behavior on UL Repetition"). If the UCI is CSI, a CC and/or a BWP to which the UCI is to be piggybacked may be determined differently for each target BLER of the CSI. That is, UCI may be grouped by target service and/or QoS and/or BLER requirement and transmitted on a channel corresponding to the same target service and/or QoS and/or BLER requirement. For example, CSI having a target BLER of $10^{-2}$ may be transmitted on a PUSCH having a BLER requirement of $10^{-2}$, and CSI having a target BLER of $10^{-5}$ may be transmitted on a PUSCH having a BLER requirement of $10^{-5}$.

A specific UE may be configured with a plurality of CSI processes or modes by an eNB, and a target BLER, and/or a reference resource and/or a BLER requirement and/or CSI configuration information and/or a CSI feedback transmission method may be configured independently for each CSI process or mode.

Alternatively, UCI may be mapped to a PUSCH differently for each target service and/or QoS and/or BLER requirement and/or target BLER of the UCI. For example, it may be regulated that UCI with a high BLER requirement is mapped to a symbol closer to a DMRS. This may mean that only when two different types of UCI having different reliability requirements are multiplexed and mapped to one PUSCH, different mapping may be used between the two types of UCI. Alternatively, different mapping may always be assumed to reduce ambiguity between the case and a case of transmitting UCI for one QoS.

Further, when the target BLER of ae transmission PUSCH and the target BLER of UCI are different, a transmitted DMRS pattern may be configured to follow the higher of the target BLERs. For example, a higher-density DMRS pattern is needed for a higher BLER, and when the target BLER of the UCI is higher than the BLER of the PUSCH, the DMRS pattern may be a DMRS pattern required for the UCI. This DMRS pattern configuration may be selected by the UE or configured by a higher-layer signal and/or DCI.

Alternatively, a different coding rate and/or the presence or absence of a CRC may be applied for each target service and/or QoS and/or BLER requirement and/or target BLER of the UCI. For example, when the target BLER of the UCI is low, the CRC of a channel carrying the UCI may be omitted. When the target BLER of the UCI is high, the CRC of the channel carrying the UCI may be added. The above description is applicable even when the UCI is piggybacked to the PUSCH, but may also be applied when the UCI is transmitted on one channel (e.g., PUCCH).

Alternatively, a different resource allocation may be configured for a UCI transmission channel for each target service and/or QoS and/or BLER requirement and/or target BLER of the UCI. For example, an offset used in configuring a resource for use in transmitting UCI may be independently configured for each target service and/or QoS and/or BLER requirements and/or target BLER.

Alternatively, when the UCI transmission channel is a PUCCH, a different channel format and/or type may be determined/selected for each target service and/or QoS and/or BLER requirement and/or target BLER of the UCI. For example, when the target BLER of the UCI is low, the UCI may be based on PUCCH format 2, and when the target BLER of UCI is high, a new PUCCH format may be used and this PUCCH format may be transmitted differently by time-domain and/or frequency-domain and/or carrier-domain diversity based on a Reed-Muller (RM) code with a CRC added.

Alternatively, a different TTI length and/or numerology (e.g., subcarrier spacing) and/or duration may be determined/selected for a UCI transmission channel, for each target service and/or QoS and/or BLER requirement and/or target BLER of UCI. For example, in the case of an HARQ-ACK for a channel that targets high reliability, the corresponding UCI is transmitted on a channel (e.g., a long PUCCH) with a relatively long TTI length or duration. In the case of an HARQ-ACK for a channel targeting low latency, it may be regulated that the UCI is transmitted on a channel (e.g., short PUCCH) with a relatively short TTI length or duration.

This selection (e.g., PUCCH format selection and/or UCI mapping scheme selection and/or inclusion or non-inclusion of a CRC and/or resource allocation and/or TTI length and/or numerology and/or channel duration, etc.) may be indicated dynamically by DCI or determined according to the content of the UCI (e.g., if CSI is a feedback for a high target BLER or a feedback for a low target BLER). In the case of an A/N, the A/N may be mapped to a bearer carrying a PDSCH. Alternatively, the QoS of the A/N may be indicated by DCI. Alternatively, as scheduling for each PDSCH may be distinguished by a QoS, the QoS of an A/N may also be determined according to each QoS, and such mapping may be configured by a high layer or implicit mapping may be assumed.

Frequency-Domain Repetition for UCI

In order to increase the reliability of a UCI transmission, repeated transmissions of UCI in a plurality of CCs and/or BWPs, that is, frequency-domain repetition/segmentation may be considered. By PUSCH scheduling, it may be determined how frequency-domain repetition/segmentation of the UCI transmission is to be applied.

Characteristically, the frequency-domain repetition/segmentation of the UCI transmission may be determined by the number of RBs (or the amount of allocated resources) of the PUSCH scheduled in each CC and/or BWP. In one method, the frequency-domain repetition/segmentation of the UCI transmission may be applied only to CCs and/or BWPs scheduled over a predetermined number of RBs or more RBs. In this case, the reference number of RBs may be configured by a higher-layer signal or indicated by DCI. Particularly, a different reference number of RBs may be configured/indicated according to a system bandwidth.

In another method, it may be regulated that UCI is piggybacked and transmitted with priority to a CC and/or BWP having a relatively large number of RBs. The number of CCs and/or BWPs in which actual UCI will be transmitted may be configured by a higher-layer signal or indicated by DCI. Particularly, a different number of CCs and/or BWPs may be configured/indicated according to a system bandwidth.

More generally, irrespective of PUSCH scheduling, the number/indexes of CCs and/or BWPs subjected to frequency-domain repetition/segmentation of particular UCI may be configured by a higher-layer signal or indicated by DCI. Particularly, a different number/indexes of CCs and/or BWPs may be configured/indicated according to a system bandwidth.

Alternatively, it may be regulated characteristically that UCI is transmitted in a different number/different indexes of CCs and/or BWPs according to the type of the UCI. For example, it may be regulated that an HARQ-ACK is repeatedly piggybacked in 5 cells, starting from the lowest cell index among PUSCH scheduled cells, and CSI is repeatedly piggybacked in the remaining cells. In this case, information about the number/indexes of cells to be piggybacked for each UCI type may be predefined, configured by a higher-later signal, or indicated by DCI. More characteristically, when UCI is piggybacked to a different cell according to the type of the UCI, a different UCI mapping rule from the legacy mapping rule may be applied such that an RI is mapped to a symbol closest to a DMRS (similar to HARQ-ACK mapping in the LTE standard), and a CQI/PMI is mapped to a symbol second-closest to the DMRS (similar to RI mapping in the LTE standard). This mapping may help to further improve the transmission reliability of UCI.

An exception rule may be defined such that UCI is not actually transmitted in among the "CCs in which UCI is transmitted" determined by the rule, under a specific condition. Characteristically, it may be regulated that UCI is not actually loaded in a CC and/or a BWP in which a (predefined or signaled) TTI length and/or numerology is used/scheduled.

PUCCH Repetition/Segmentation in Frequency Domain Using SCell

In order to obtain frequency diversity even during transmission of UCI on a PUCCH, frequency-domain repetition/segmentation may be performed. Although the PUCCH is generally transmitted in a CC configured as a PCell, it may be regulated that the PUCCH is also transmitted in an SCell through repetition or segmentation, for frequency diversity. Since this operation may not always be desirable in terms of power allocation or scheduling, whether the frequency-domain repetition/segmentation operation for the PUCCH in the SCell is activated/deactivated or enabled/disabled may be configured by a higher-layer signal or indicated by DCI. In addition, which CC and/or BWP is subjected to the frequency-domain repetition/segmentation operation for the PUCCH may be configured by a higher-layer signal or indicated by DCI. More characteristically, the DCI may be scheduling DCI, and whether to provide the indication by DCI or a higher-layer signal may be different according to the type of the UCI.

During the frequency-domain repetition/segmentation operation for the PUCCH, a resource in which the PUCCH is to be transmitted may be implicitly determined in each CC and/or BWP. In one example, the PUCCH may be transmitted in the same PUCCH resource indicated by DCI in CCs and/or BWPs in which the PUCCH is to be repeated. In another example, a resource offset may be configured for each CC and/or BWP by a higher-layer signal, and final PUCCH resources may be determined by applying the offsets set for the respective CCs and/or BWPs from a PUCCH resource indicated by DCI. In another example, DCI may include a plurality of ACK/NACK resource indicators (ARIs), each of which may indicate a PUCCH resource of each CC (set) and/or BWP (set). The indication method may be generally extended to a case in which a PUCCH is transmitted through repetition or segmentation in the time/space domain (or any other domain).

It may be regulated that during the frequency-domain repetition/segmentation operation for the PUCCH, a PUSCH is transmitted with priority in CC(s) in which the PUSCH is scheduled, while the transmission of the PUCCH is dropped. In other words, it may be regulated that the frequency-domain repetition/segmentation operation for the PUCCH is performed only for CCs (SCells) and/or BWPs in which the PUSCH is not scheduled. Alternatively, it may be regulated that during the frequency-domain repetition/segmentation operation for the PUCCH, the scheduled PUSCH is dropped and the PUCCH is transmitted in a part of the CC(s) scheduled for the PUSCH, while the scheduled PUSCH is transmitted only in the remaining CC(s). In this case, information about the number/indexes of CCs and/or BWPs in which frequency-domain repetition/segmentation of a PUCCH has priority over PUSCH scheduling (or PUSCH scheduling has priority over frequency-domain repetition/segmentation of a PUCCH) may be configured by a higher-layer signal or indicated by DCI.

It may be regulated that when the frequency-domain repetition/segmentation operation for the PUCCH is enabled, a UE which is not capable of/is not configured with simultaneous PUCCH/PUSCH transmission piggybacks the entire UCI or partial (of a high priority) to PUSCH(s)m while dropping the PUCCH transmission in all CCs. In another method, it may be regulated that the UCI is transmitted through frequency-domain repetition/segmentation of the PUCCH in the PCell and other SCell(s), while the entire PUSCH is dropped. Which one between the above two operations is to be performed by the UE may be configured by a higher-layer signal or indicated by DCI.

For a UE capable of/configured with simultaneous PUCCH/PUSCH transmission, the following priority may be considered in power allocation.

Alt 1: PUCCH on PCell>PUCCH on SCell(s)>PUSCH with UCI>PUSCH without UCI

Alt 2: PUCCH on PCell>PUSCH with UCI>PUCCH on SCell(s)>PUSCH without UCI

It may be regulated that in a power-limited situation, the UE performs power reduction and/or drop on channels in an ascending order of priority in the above prioritization. It may be regulated that power is scaled down equally across all or a part of the channels, for power reduction.

Carrier/BP Selection

In a method of achieving frequency diversity in PUCCH/PUSCH transmission, it may be regulated that a CC and/or a BWP in which the PUCCH/PUSCH is transmitted is dynamically changed by DCI. More specifically, it may be regulated that the channel is mapped to a different CC and/or BWP in each symbol.

Characteristically, each state of an ARI may correspond to a CC and/or a BWP in which a PUCCH is transmitted, together with a PUCCH resource, and one of the states may be indicated by DCI. Herein, BWPs may correspond to different CCs. For a PUSCH, a BWP in which the PUSCH is transmitted may be indicated by DCI. Alternatively, an ARI-like field may be defined in a UL grant, each state of the ARI-like field may correspond to a resource for transmitting a PUSCH and/or a CC and/or a BWP in which the PUSCH is transmitted, and one of the states may be indicated by DCI.

In another method, it may be regulated that each state of the ARI (or another DCI field) corresponds to a plurality of PUCCH (PUSCH) resources and/or a plurality of CCs and/or a plurality of BWPs in which a PUCCH (PUSCH) is to be transmitted. This may enable more flexible selection of PUCCH (PUSCH) transmission resources. The UE may select one of PUCCH (PUSCH) resources indicated by the ARI (or another DCI field) and/or one or more of the CCs and/or one or more of the BWPs to transmit the PUCCH (PUSCH).

In another method, the UE may select a CC and/or a BWP in which the PUCCH (PUSCH) is to be transmitted. Characteristically, a (set of) plurality of CC candidates and/or BWP candidates may be indicated by the network, and a CC and/or a BWP for transmitting the PUCCH (PUSCH) may be selected from among the CC candidates and/or the BWP candidates.

In another method, only a PUCCH/PUSCH transmission is triggered by DCI, and the UE selects a UL resource randomly or in a predetermined rule from among UL resources configured for grant-free transmission in each CC and/or BWP and performs a UL transmission in the selected UL resource.

The method of indicating/configuring a CC and/or a BWP may be performed independently (differently) for each symbol in which the PUCCH/PUSCH is transmitted.

In the operation of dynamically selecting a CC/BP for a PUCCH, it may be regulated that when a PUSCH is scheduled in a configured/indicated/selected CC and/or BWP, a UE which is not capable of/configured with simultaneous PUCCH/PUSCH transmission piggybacks entire UCI or (high-priority) partial UCI of a PUCCH to PUSCH(s). In another method, it may be regulated that the PUCCH is transmitted, while the PUSCH is dropped, in a corresponding CC and/or BWP. Which operation between the above two operations is to be performed by the UE may be configured by a higher-layer signal or indicated by DCI.

For a UE capable or/configured with simultaneous PUCCH/PUSCH transmission, particularly when a PUCCH transmission CC is not a PCell, the following prioritization may be considered in power allocation.

Alt 1: PUCCH on SCell(s)>PUSCH with UCI>PUSCH without UCI

Alt 2: PUSCH with UCI>PUCCH on SCell(s)>PUSCH without UCI

It may be regulated that in a power-limited situation, the UE performs power reduction and/or drop on channels in an ascending order of priority in the above prioritization. It may be regulated that power is scaled down equally across all or a part of the channels, for power reduction.

When the above CC/BP selection method is applied to PUCCH transmission, it may be regulated that a power control or a transmission power control (TPC) is shared. Alternatively, when a CC and/or a BWP in which a PUCCH is transmitted is dynamically changed by DCI, it may be regulated that a power control or a TPC is also applied only to the corresponding CC and/or BWP. Alternatively, when a group TPC is defined as in DCI format 3/3A, it may be regulated that group TPC information is monitored/received from each CC and/or each BWP of an SCell as well as a PCell, to apply the group TPC information to PUCCH transmission in the CC and/or BWP. Alternatively, DCI including a group TPC may be transmitted in a specific CC and/or BWP, further including information about a CC and/or a BWP to which the group TPC is to be applied.

Hopping Pattern Selection

In order to maximize reliability, a method of repeatedly transmitting a signal in multiple carriers/frequencies/BWPs may be considered. However, simultaneous transmissions may not be performed depending on the power limit or the situation of the UE. In this case, only one transmission is performed at a time, but in a manner that maximizes frequency diversity. One proposal may be to use a different frequency hopping unit and pattern according to a target BLER and/or a QoS requirement and/or a service type and/or a numerology. For a PUSCH, for example, hopping may occur every K symbols, aside from existing inter-slot hopping or one hopping in one slot, and there may be multiple K values. A hopping function may also be different according to a hopping unit, and one of the reasons for different hopping functions is that different resources may be configured in each hopping unit to reduce collisions between resources having different hopping units, and a different hopping pattern is set to perform hopping in the hopping unit.

In order to maximize frequency diversity, not only hopping within one CC but also cross-CC hopping may occur. Since different CCs are activated for each UE, this configuration may be UE-specific. Alternatively, a cross-CC hopping unit may be commonly applied to UEs, with different hopping levels in CCs. For a PUCCH, multiplexing between UEs is important, and thus, a semi-static or dynamic indication may be provided as to whether cross-CC scheduling is possible according to the multiplexing.

Alternatively, a CC in which a PUCCH is transmitted for multiplexing may be dynamically changed for a group of UEs. For example, through cell-specific signaling, CC A and CC B may be configured to be used in "even-numbered" and "odd-numbered" slots or in the half-slots of one slot. A UE accessing all of the cells may dynamically change the UL frequency between CC A and CC B. To support this scheme, the UE may need to support UL for both of CC A and CC B. Characteristically, CC A and CC B may be intra-band UL or may be different bands. Particularly when CC A and CC B are configured in low and high frequency ranges, it is also assumed that different numerologies may be used, and a numerology and a resource configuration set for each CC may be followed at each transmission timing. In consideration of different numerologies or the like, a slot size may be determined according to a DL numerology or the smallest of the subcarrier spacings of UL CCs, or may be configured/indicated (e.g., between CC A and CC B) by a higher-layer/physical-layer signal from the network.

UCI Feedback with Different Service Type or Different Target BLER

When transmission resources (e.g., time) of HARQ-ACKs for data having different target services and/or QoSs and/or BLER requirements overlap with each other, it may be regulated that a lower-priority HARQ-ACK among the HARQ-ACKs is dropped, or bundling/multiplexing of HARQ-ACKs for data having different target services and/or QoSs and/or BLER requirements is not allowed. Herein, priorities may be given such that eMBB<URLLC or a higher priority may be assigned to a higher BLER requirement.

Alternatively, it may be regulated that the plurality of HARQ-ACKs are transmitted bundled/multiplexed on one channel. Characteristically, the plurality of HARQ-ACKs may be transmitted bundled/multiplexed on a higher-priority HARQ-ACK channel or a channel corresponding to a stricter BLER requirement.

Alternatively, it may be regulated that the plurality of HARQ-ACKs are transmitted on separate channels. Characteristically, the HARQ-ACKs may be allowed to be transmitted on separate channels, only when the UE is in a non-power-limited situation at the time. Alternatively, since an excessive peak to average power ratio (PAPR) may not be desirable, the separate HARQ-ACK channel transmission may be allowed only when a specific waveform (e.g., cyclic prefix-OFDM (CP-OFDM)) is used on the UL. If this operation causes a power-limited situation, a lower-priority HARQ-ACK may be dropped or transmitted bundled/multiplexed on a higher-priority HARQ-ACK channel, a higher-power channel, or a lower coding-rate channel.

The above proposal may be similarly applied to a HARQ-ACK and CSI combination and/or a CSI and CSI combination.

It may be regulated that when the number of coded symbols (i.e., REs in the LTE standard) for UCI transmission in a PUSCH is calculated, a (different) beta offset is configured independently according to a target service/QoS for which UCI is or a target BLER for that UCI, and the UCI is transmitted piggybacked to the PUSCH by applying this (determining UCI transmission REs and performing UCI mapping to the REs). Alternatively, the number of coded symbols (i.e., REs in the LTE standard) for UCI transmission in a PUSCH may be configured independently (or differently) according to a target service/QoS for which UCI is, or a target BLER or TTI length/subcarrier spacing for that UCI.

For a specific UL waveform (e.g., CP-OFDM), a power-related parameter for coded symbols (i.e., REs in the LTE standard) for UCI transmission may be configured or indicated by a higher-layer signal or DCI, separately (differently) from a power-related parameter for coded symbols for data transmission. For example, signaling may be defined such that the power of coded symbols for UCI transmission relative to the power of coded symbols for data transmission is determined to be an offset or ratio.

DCI Design for CC/TRP Diversity

Figure 9:
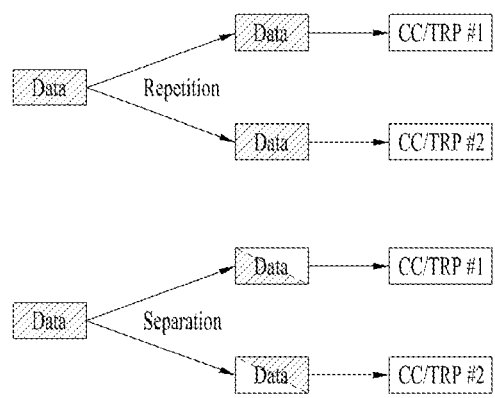
FIG. 9 illustrates repetition or segmentation of data packets allocated to multiple component carriers (CCs) or transmission and reception points (TRPs)

If data is transmitted/received in a plurality of CCs/TRPs through repetition or segmentation, as illustrated in FIG. 9, it may be regulated that each DCI scheduling the repeated or segmented transmission schedules only data to be transmitted/received in each CC/TRP. In this case, information indicating that the data transmitted/received in the plurality of CCs/TRPs may be combined may be included in each scheduling DCI or separate DCI (e.g., group-common DCI) or preconfigured by a higher-layer signal, so that the UE may combine the data transmitted/received in the plurality of CCs/TRPs through repetition or segmentation.

In another method, DCI scheduling a specific CC/TRP may include scheduling information for data to be transmitted/received in the plurality of CCs/TRP. More specifically, the single DCI may include necessary information such as resource allocation and/or an MCS for the plurality of CCs/TRPs. Upon receipt may consider that schedulings of the plurality of CCs/TRPs may be combined without an additional signal and accordingly, performs a data transmission/reception operation. It may be regulated that the scheduling information (e.g., an MCS, an RA, and so on) is signaled separately for the plurality of CCs/TRPs, or is selected from among preset/preconfigured candidates or is a common value in consideration of signaling overhead.

In another method, it may be regulated that DCI including scheduling information for data to be transmitted/received in a plurality of CCs/TRPs is repeatedly transmitted in the plurality of (or a predetermined part of) CCs/TRPs. In this case, since the UE may perform transmission/reception in all of the CCs/TRPs as long as the DCI reception is successful even in a part of the plurality of CCs/TRPs, this may help with more reliable transmission/reception.

Mapping Rule for Carrier Diversity

When one TB/CBG/CB is segmented and mapped to a plurality of CCs, a method of mapping TB/CBG/CB segments to a plurality of layers, subcarrier spacings, and symbols is proposed.

Alt 1: The TB/CBG/CB segments are first mapped in the order of layer, frequency domain, and time domain in one CC, and then mapped in CC-domain units. In this case, since mapping may be performed only in a specific CC, it may be regulated that this method is applied only to a TB/CBG/CB equal to or larger than a predetermined TB/CBG/CB size. The mapping may first be performed in K symbols, then across the CC, and in the remaining symbols again according to the above rule.

Alt 2: Mapping is performed in the order of layer, frequency domain, CC domain, and time domain, or in the order of layer, CC domain, frequency domain, and time domain. This method may be considered for a shorter processing time because the time-domain mapping is performed in the last place.

If carriers have different numbers of layers, different scheduled PRB sizes, or different slot lengths, mapping may be completed first in the carrier with the smaller number of layers, the smaller scheduled PRB size, or the smaller slot length. In this case, mapping may be performed by applying the same rule only to a carrier in which resources remain in the layer/frequency/time domain.

If the CCs have different numerologies (e.g., subcarrier spacings), it may be regulated that time-domain mapping is performed a plurality of times for the remaining larger subcarrier spacings with respect to the smallest subcarrier spacing, so that the time-domain mapping is performed at the same level as for the smallest subcarrier spacing. For example, when CC 1 and CC 2 are set to subcarrier spacings of 15 kHz and 30 kHz, respectively, mapping to time index #n of CC 1 may be followed by mapping to time indexes #2n and #2n+1 of CC 2, for the same layer/frequency/CC (or carrier) index. Alternatively, when the CCs have different numerologies, a default numerology as a reference may be predefined/preset or configured by a higher-layer signal. Alternatively, when the CCs have different numerologies, it may be regulated that a numerology corresponding to a PCell or a primary BWP is regarded as a default numerology serving as a reference. Alternatively, when the CCs have different numerologies, it may be regulated that the segmentation operation is not allowed. Alternatively, when the CCs have different numerologies, the segmentation operation may be performed only in CCs having subcarrier spacings equal to or larger than a default subcarrier spacing serving as a reference.

The above mapping method may be applied only when an operation of transmitting one TB/CBG/CB in a plurality of CC/TRPs is configured. Alternatively, whether the mapping method is applied may be configured/indicated by a higher-layer signal or DCI. Alternatively, whether the mapping method is applied may be determined based on the MCS and/or MCS and/or coding rate of the TB/CBG/CB.

Priority Rule Between Different CSI Feedbacks/SRS with Different BLER Requirements Depending on the target service and/or BLER requirement of a CSI feedback, a different priority may be assigned to the CSI feedback in terms of power allocation and/or drop. Characteristically, it may be regulated that a high priority is assigned to a channel carrying CSI with a stricter BLER requirement. For example, a PUSCH carrying CSI with a stricter BLER requirement may be transmitted with higher reliability by assigning a higher priority to CC 2 between a PUSCH with CSI (1e-1 BLER) in CC1 and a PUSCH with CSI (1e-5 BLER) in CC2. That is, it may be regulated that in a power-limited situation, the PUSCH with CSI (1e-1 BLER) in CC1 is first subjected to power reduction or dropped. In another example, power may be allocated to a PUSCH with priority over a PUCCH, with the remaining power available to the PUCCH by assigning a higher priority to CC 2 between the PUCCH with CSI (1e-1 BLER) in CC1 and the PUSCH with CSI (1e-5 BLER) in CC2. Further, it may be regulated that in a power-limited situation, the PUCCH with CSI (1e-1 BLER) in CC1 is first subjected to power reduction or dropped.

The rule may be more generally defined such that a higher priority is assigned to a channel carrying UCI with a stricter BLER requirement. It may be regulated that a higher priority is assigned to CC 2 between a PUSCH with HARQ-ACK (1e-1 BLER) in CC1 and a PUSCH with HARQ-ACK (1e-5 BLER) in CC2, so that in a power-limited situation, the PUSCH with HARQ-ACK (1e-1 BLER) in CC1 is first subjected to power reduction or dropped.

That is, channel type, UCI type, and BLER requirement (or service type) may be considered together in power allocation and/or drop. For example, priorities may be determined in the order of BLER requirement>UCI type (e.g., HARQ/SR>CSI>data)>channel type (e.g., PUCCH>PUSCH>SRS).

An SRS may be defined for a different target service and/or QoS and/or BLER requirement from a legacy one. More characteristically, it may be regulated that an SRS is transmitted separately for more accurate channel estimation of a more latency-sensitive and/or reliability-sensitive service type and/or channel. Further, it may be regulated that a higher priority is assigned to a channel/SRS of a service type with a stricter BLER requirement, and an SRS with a stricter BLER requirement may ha a higher priority than a PUSCH. For example, priorities may be defined in the order of URLLC PUSCH>SRS (1e-5 BLER requirement)>eMBB PUSCH>SRS (1e-1 BLER requirement). More specifically, the prioritization may be different according to a periodic SRS and a (triggering-based) aperiodic SRS. For example, priorities may be defined in the order of A-SRS (1e-5 BLER)>HARQ-ACK (1e-1 BLER)>P-SRS (1e-5 BLER). Further, even for the aperiodic SRS, different priorities may be configured according to an SRS triggered by DCI for a PDSCH and an SRS triggered by DCI for a PUSCH.

Diversity Via DCI Combining

For high reliability requirements for specific traffic, the reliability of a control channel that schedules the traffic may also be important. Therefore, to improve the reliability of DCI, it may be regulated that DCI is repeated for transmission. Specifically, the following methods are available.

(Method 1) When DCI that schedules specific DL or UL data is repeatedly transmitted, it may be regulated that each DCI is an individual transmission and thus self-decodable, and there is no problem in data scheduling even though only one of the repeated DCIs is received.

(Method 2) When DCI that schedules specific DL or UL data is repeatedly transmitted, it may be regulated that the DCI is transmitted by chase combining (CC) or incremental redundancy (IR) and when the DCI is received, the DCI is decodable by combining.

To support (Method 2), the following method may be considered in DCI decoding at the UE. Characteristically, it may be regulated that DCI transmitted in one candidate is individually decodable or DCIs in the same candidates received in the same control resource sets (CORESETs) in different slots (or mini-slots or predefined or preconfigured monitoring intervals) are combinable by CC or IR.

Figure 10:
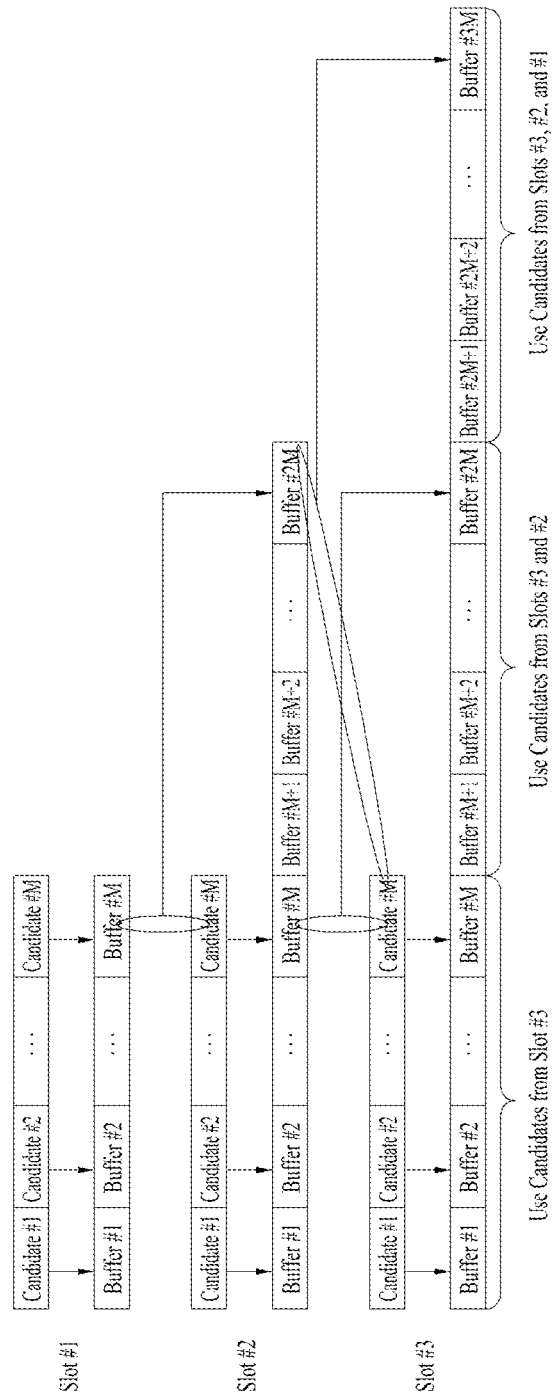
FIG. 10 illustrates exemplary iterative decoding of downlink control information (DCI)

In a characteristic example, in a first slot, the UE attempts M decodings for M candidates and stores the M candidates in a buffer. In a second slot, the UE attempts M decodings for M candidates and stores the M candidates in a buffer. In addition, the UE stores M candidates obtained by combining the stored candidates of the first slot with the new candidates by CC in a buffer. In a third slot, the UE attempts M decodings for M candidates and stores the M candidates in a buffer. In addition, the UE stores M candidates obtained by combining the decoded and stored candidates of the second slot with the new candidates by CC in a buffer. Finally, the UE stores new M candidates obtained by combining the stored M candidates resulting from the combining operation of the second slot with new candidates by CC or IR in a buffer. FIG. 10 illustrates this procedure.

In general, it may be regulated that in addition to attempting M decodings for new M candidates and storing the decoded M candidates in a buffer in a K-th slot, the UE decodes additional (K−1)M decodings by combining new candidates with candidates stored in the buffer and stores the resulting decoded candidates in a buffer. Although the proposal requires more blind decodings and a larger buffer amount, it offers the advantage that DCI is decodable and a decoding gain for the DCI may be obtained, irrespective of a repetition number and/or without accurate knowledge of the starting point of repetitions.

More characteristically, it may be regulated that candidates transmitted with the same CCE indexes are to be combined. Alternatively, it may be regulated that a CCE index (offset) of a candidate to be combined during decoding is determined by a value derived from a slot index (or a subframe or a radio frame or a mini-slot). Alternatively, information about the CCE index (offset) of the candidate to be combined may be preconfigured by a higher-layer signal. Alternatively, the CCE index (offset) of the candidate to be combined may be dynamically indicated by specific DCI. The rules may include relative CCE locations being the same in CORESETs or applying an offset in a CORESET.

Similarly, it may be regulated that the same candidates in the same CORESETs of different CCs are combinable by CC or IR. Alternatively, it may be regulated that the same candidates in the same CORESETs of different antennas (antenna ports) are combinable by CC or IR.

When the above-described DCI combination is applied, it is necessary to determine DCI that serves as a reference for a DL control-to-DL data and/or UL grant-to-UL data timing and/or a DL data-to-HARQ timing. Therefore, in this case, it may be regulated that a flag for the DCI as a reference is included in DCI. Alternatively, it may be regulated that DCI transmitted in a specific resource (or CORESET) configured by a higher-layer signal (or indicated by DCI) is a reference for a DL control-to-DL data and/or UL grant-to-UL data timing and/or a DL data-to-HARQ timing. Alternatively, it may be regulated that DCI transmitted at a time corresponding to (or determined/derived from) a specific mini-slot/slot/subframe/wireless-frame index is a reference for a DL control-to-DL data and/or UL grant-to-UL data timing and/or a DL data-to-HARQ timing. Alternatively, it may be regulated that the UE follows the timing indicated by each DCI.

Characteristically, a different starting slot (or mini-slot) may be configured for each PDCCH candidate (set). Information about the starting slot (or mini-slot) may be configured for/indicated to the UE by a higher-layer signal and/or DCI. Alternatively, the starting slot (or mini-slot) of a specific PDCCH candidate (set) may be configured, and the starting slots (or mini-slots) of the remaining PDCCH candidates (candidate sets) may be determined based on a predefined pattern or offset or a pattern or offset configured by a higher-layer/physical-layer signal. For example, if it is indicated that candidate #1 starts in slot #1 and candidate #2 starts in slot #2, the UE may flexibly adjust the starting slot of each candidate, while performing combining more easily, by identifying the starting slot of each candidate.

Time Repetition/Segmentation

As one way to ensure reliability, time repetition/segmentation of a channel may be considered. For higher reliability, a channel for traffic corresponding to a specific target service and/or QoS and/or requirement may be transmitted in a plurality of TTIs through repetition or segmentation. If DMRS overhead is burdening for reasons such as a (short) TTI length, a structure in which multiple TTIs share the DMRS may be considered. In the case of time repetition/segmentation, a control channel that schedules this may not be transmitted in each TTI, and thus TTIs in which the DMRS is to be transmitted/included may be predefined by predefining a DMRS pattern. Alternatively, a plurality of patterns may be defined and a pattern may be configured by a higher-layer signal or dynamically indicated by DCI. The DMRS pattern may be applied according to each sTTI or TTI in repetition occurs, or may be configured according to an sTTI index or a slot index.

For example, when the DMRS is configured in a pattern {[DR] [DD] [RD] [DD]}, the pattern may be applied from the starting point of repetitions or may be unconditionally repeated every 4 sTTIs. Alternatively, the pattern may be fixedly mapped to specific sTTI indexes at all time. In 2-OFDM symbol (OS) and 3-OS sTTIs, D may be attached before or after a 2OS-based pattern, or a different pattern may be given. Further, in the case of a transmission configured without a grant, like SPS, a pattern to be used may be configured or indicated by valid DCI. If data transmitted without a grant is used for a retransmission in addition to an initial transmission, an RS pattern used for the retransmission may be configured to be different from an RS pattern of the initial transmission. Likewise, a similar pattern or operation may be considered for the presence or absence of the DMRS or a DMRS pattern, or a used scrambling ID. In addition, if there are multiple resource configurations, it is possible to configure/indicate such a pattern for each resource configuration.

In the case of a subslot (of a 2-symbol or 3-symbol sTTI) operation, the structure of a DL TTI in a subframe is determined by the length of a CFI indicated by a PCFICH. If the CFI is 1 or 3, one subframe including 14 symbols includes 6 sTTIs of {3,2,2,2,2,3}. When the CFI is 2, one subframe includes 6 sTTIs of {2,3,2,2,2,3}. If the UE fails to obtain a correct CFI value due to failure in PCFICH decoding, the UE may not determine the sTTI structure in the corresponding subframe. For URLLC traffic, this error may be undesirable and thus require handling.

It may be regulated that only symbol indexes #3 and #4 are used for DL-SCH mapping in the second sTTI of a subframe. This has the advantage that the same DL-SCH reception performance may be expected regardless of the PCFICH decoding error. Alternatively, it may be regulated that mapping is performed for symbol index #2 after DL-SCH mapping is completed for symbol indexes #3 and #4 in the second sTTI of the subframe. In other words, at least a part corresponding to systematic bits may be mapped first, followed by mapping the remaining part (the presence of which the UE may not be sure) to symbol index #2. Alternatively, in consideration of such an operation, when the UE receives a NACK, data mapped to sTTI #0 or #1 whose sTTI mapping is changed according to the PCFICH may be flushed. That is, when mapping is not certain in a specific sTTI, the UE may exclude the sTTI from HARQ-ACK combining. Alternatively, the UE may assume that a repetition occurs in cross-subframes only when the PCFICH of the previous subframe is the same. Therefore, when the PCFICH value is different from that in the previous subframe, the UE may ignore the repetition mapped to the corresponding sTTI, determining that the detection of the PCFICH does not have high reliability. Alternatively, it may be assumed that cross-subframe repetition is allowed only when a PCFICH value is equal to a configured value. That is, when cross-subframe repetition is scheduled, the UE assumes a CFI value which is preset or configured/indicated by a higher-layer/physical-layer signal to be the CFI value of a corresponding subframe.

Repetition and Subband/BWP Switching

While the UE is performing repetition, a DL or UL subband or BWP configured for the UE may be changed. Such examples may include a case in which the UE moves to a default subband/BWP by a default timer or a case in which subband/BWP switching occurs. In this case, the repetition may continue in a new subband/BWP or the subband/BWP may not be changed until the repetition ends in switching or the repetition ends. Alternatively, the network may configure an operation to be performed. Alternatively, the repetition may continue if a resource in which the repetition is performed is included in the old/new subband/BWP. Alternatively, BWP switching and repetition may be continued according to a UE capability. For example, when a UL BWP is changed according to a DL BWP in an unpaired case, the DL BWP may be changed, but the UL BWP may not be changed for the repetition and may be changed after the repetition. Depending on UE implementation, the repetition may be terminated at a corresponding time or continued.

The UE may report whether it has the capability of supporting BWP switching and repetition at the same time, or the network may define a configuration for a corresponding operation by a higher-layer signal. If the UE is not capable of supporting the operation and/or the network has not configured the operation, the UE does not expect BWP switching to be set/indicated during the repetition. Alternatively, in this case, the UE may terminate the repetition, when BWP switching occurs.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB.

Figure 11:
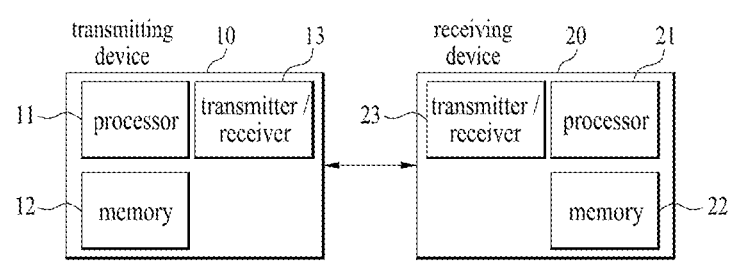
FIG. 11 is a block diagram for a device configured to implement embodiment(s) of the present disclosure.

FIG. 11 is a block diagram of a transmitting device 10 and a receiving device 20 configured to implement exemplary embodiments of the present disclosure. Referring to FIG. 6, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. An RS transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on UL and as the receiving device 20 on DL. In embodiments of the present disclosure, an eNB serves as the receiving device 20 on UL and as the transmission device 10 on DL.

The transmitting device and/or the receiving device may be configured as a combination of one or more embodiments of the present disclosure.

As one of a combination of these proposals, a UE for transmitting an uplink signal in a plurality of serving cells in a wireless communication system includes a receiver and a transmitter, and a processor configured to control the receiver and the transmitter. The processor may be configured to receive a configuration indicating whether a repetition operation or a segmentation operation is enabled for a PUCCH in at least one secondary serving cell, and transmit the PUCCH by repeating or segmenting the PUCCH in the at least one secondary serving cell according to the received configuration, and the configuration includes information about a secondary serving cell and/or a BWP subjected to the repetition operation or the segmentation operation.

Additionally, the processor may be configured to receive a resource offset to determine a resource for use in transmitting the PUCCH in the secondary serving cell and/or the BWP, and determine the resource for use in transmitting the PUCCH based on the resource offset.

Additionally, a resource offset may be configured for each secondary serving cell and/or each BWP, and a PUCCH resource in the secondary serving cell and/or the BWP may be determined to be a PUCCH resource spaced from a PUCCH resource indicated by the received configuration by the resource offset for the secondary serving cell and/or the BWP.

Additionally, a PUSCH scheduled in a part of the at least one secondary serving cell may be dropped.

Additionally, when a simultaneous PUCCH and PUSCH transmission is configured for the UE, priority for transmission power allocation is determined according to a channel type, a serving cell index, and whether UCI is included.

Additionally, the information about the secondary serving cell and/or the BWP subjected to the repetition operation or the segmentation operation may be changed by DCI related to the PUCCH.

Additionally, the PUCCH may be mapped to a different secondary serving cell and/or BWP in each symbol.

Additionally, each state of a specific field in the DCI may correspond to one of a plurality of secondary serving cells and/or BWPs, and upon receipt of the DCI, a repetition or segment of the PUCCH may be transmitted in at least one secondary serving cell and/or BWP selected from among the plurality of secondary serving cells and/or BWPs.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure may be used in a wireless communication device such as a UE, a relay, an eNB, and so on.

What is claimed is:

1. A method for transmitting a Hybrid Automatic Repeat Request-Acknowledge (HARQ-ACK) by a user equipment (UE) in a wireless communication system, the method comprising:
    receiving a first Physical Downlink Shared Channel (PDSCH);
    canceling a first uplink channel including a first HARQ-ACK which is a response to the first PDSCH,
    wherein the first uplink channel is scheduled on a plurality of resources including a first resource;
    receiving one or more second PDSCHs;
    transmitting a second uplink channel including a second HARQ-ACK in response to the one or more second PDSCHs,
    wherein the second uplink channel is transmitted on the first resource, and
    wherein, based on the second uplink channel being a Physical Uplink Shared Channel (PUSCH), a beta offset for the second HARQ-ACK is determined based on a number of bits of the second HARQ-ACK.

2. The method of claim 1, wherein the first uplink channel is dropped in the first resource.

3. The method of claim 1, wherein a priority of the first uplink channel is smaller than a priority of the second uplink channel.

4. The method of claim 1, wherein the first uplink channel is scheduled to be transmitted repeatedly on the plurality of resources.

5. The method of claim 1, wherein the first uplink channel is a physical uplink control channel (PUCCH).

6. A user equipment (UE) for transmitting a Hybrid Automatic Repeat Request-Acknowledge (HARQ-ACK) in a wireless communication system, the UE comprising:
    at least one transceiver;
    at least one processor; and
    at least one memory operably coupled to the at least one processor and storing instructions which, when executed, cause the at least one processor to perform operations comprising:
        receiving, through the at least one transceiver, a first Physical Downlink Shared Channel (PDSCH);
        canceling a first uplink channel including a first HARQ-ACK which is a response to the first PDSCH,
        wherein the first uplink channel is scheduled on a plurality of resources including a first resource;
        receiving, through the at least one transceiver, one or more second PDSCHs;
        transmitting, through the at least one transceiver, a second uplink channel including a second HARQ-ACK in response to the one or more second PDSCHs,
        wherein the second uplink channel is transmitted on the first resource, and
        wherein, based on the second uplink channel being a Physical Uplink Shared Channel (PUSCH), a beta offset for the second HARQ-ACK is determined based on a number of bits of the second HARQ-ACK.

7. The UE of claim 6, wherein the first uplink channel is dropped in the first resource.

8. The UE of claim 6, wherein a priority of the first uplink channel is smaller than a priority of the second uplink channel.

9. The UE of claim 6, wherein the first uplink channel is scheduled to be transmitted repeatedly on the plurality of resources.

10. The UE of claim 6, wherein the first uplink channel is a physical uplink control channel (PUCCH).

11. A non-transitory computer readable storage medium storing at least one computer program comprising instructions that, when executed by at least one processor, cause the at least one processor to perform operations, the operations comprising:
    receiving a first Physical Downlink Shared Channel (PDSCH);
    canceling a first uplink channel including a first HARQ-ACK which is a response to the first PDSCH,
    wherein the first uplink channel is scheduled on a plurality of resources including a first resource;
    receiving one or more second PDSCHs;
    transmitting a second uplink channel including a second HARQ-ACK in response to the one or more second PDSCHs,
    wherein the second uplink channel is transmitted on the first resource, and
    wherein, based on the second uplink channel being a Physical Uplink Shared Channel (PUSCH), a beta offset for the second HARQ-ACK is determined based on a number of bits of the second HARQ-ACK.

12. A method for receiving a Hybrid Automatic Repeat Request-Acknowledge (HARQ-ACK) by a base station (BS) in a wireless communication system, the method comprising:
    transmitting a first Physical Downlink Shared Channel (PDSCH);
    wherein a first uplink channel including a first HARQ-ACK in response to the first PDSCH is scheduled on a plurality of resources including a first resource;
    transmitting one or more second PDSCHs;
    receiving a second uplink channel including a second HARQ-ACK in response to the one or more second PDSCHs,
    wherein the second uplink channel is received on the first resource; and
    wherein, based on the second uplink channel being a Physical Uplink Shared Channel (PUSCH), a beta offset for the second HARQ-ACK is determined based on a number of bits of the second HARQ-ACK.

13. A base station (BS) for receiving a Hybrid Automatic Repeat Request-Acknowledge (HARQ-ACK) in a wireless communication system, the BS comprising:
    at least one transceiver;
    at least one processor; and
    at least one memory operably coupled to the at least one processor and storing instructions which, when executed, cause the at least one processor to perform operations comprising:
        transmitting, through the at least one transceiver, a first Physical Downlink Shared Channel (PDSCH);
        wherein a first uplink channel including a first HARQ-ACK in response to the first PDSCH is scheduled on a plurality of resources including a first resource;
        transmitting, through the at least one transceiver, one or more second PDSCHs;
        receiving, through the at least one transceiver, a second uplink channel including a second HARQ-ACK in response to the one or more second PDSCH,
        wherein the second uplink channel is received on the first resource; and
        wherein, based on the second uplink channel being a Physical Uplink Shared Channel (PUSCH), a beta offset for the second HARQ-ACK is determined based on a number of bits of the second HARQ-ACK.

* * * * *